United States Patent [19]
Lavin et al.

[11] Patent Number: 5,671,152
[45] Date of Patent: Sep. 23, 1997

[54] EFFICIENT GENERATION OF NEGATIVE FILL SHAPES FOR CHIPS AND PACKAGES

[75] Inventors: Mark A. Lavin, Westchester County; Lars W. Liebmann, Dutchess County, both of N.Y.

[73] Assignee: International Business Machines Corporation, Armonk, N.Y.

[21] Appl. No.: 444,471

[22] Filed: May 19, 1995

[51] Int. Cl.$^6$ ................................................. G06F 17/50
[52] U.S. Cl. ................................ 364/490; 364/488
[58] Field of Search ........................... 364/488, 489, 364/490; 437/250

[56] References Cited

U.S. PATENT DOCUMENTS

| | | | |
|---|---|---|---|
| 4,975,854 | 12/1990 | Yabe | 364/491 |
| 5,251,140 | 10/1993 | Chung et al. | 364/490 |
| 5,278,105 | 1/1994 | Eden et al. | 364/488 |
| 5,416,722 | 5/1995 | Edwards | 364/491 |
| 5,459,093 | 10/1995 | Kuroda et al. | 437/51 |

FOREIGN PATENT DOCUMENTS 3-129821  6/1991  Japan .

*Primary Examiner*—Vincent N. Trans
*Attorney, Agent, or Firm*—Whitham, Curtis, Whitham & McGinn; Stephen C. Kaufman

[57] ABSTRACT

An efficient method for modifying a chip or package design allows for the creation of small shapes without excessive expansion of design data. A computer program takes a physical design, represented in a computer data file, and generates a modified version of the design in which fill holes have been added. Subsequently, when the modified design is processed, the resulting semiconductor chip or package will contain physical images of the added fill holes, with the effect of making local pattern density more uniform and hence reducing process-induced variations in feature size and shape.

6 Claims, 7 Drawing Sheets c = boundary of unit cell
X = grid points not occupied by unit cells
* = grid points occupied by unit cells

EFFICIENT GENERATION OF NEGATIVE FILL SHAPES FOR CHIPS AND PACKAGES

CROSS-REFERENCE TO RELATED APPLICATIONS

The subject matter of this application is related to application Ser. No. 08/019,971, now U.S. Pat. No. 5,528,508 issued on Jun. 18, 1996, for "System and Method for Verifying a Hierarichical Circuit Design" by P. J. Russell and G. S. Weinert, application Ser. No. 08/019,927, now U.S. Pat. No. 5,519,628 issued on May 21, 1996, for "System and Method for Formulating Subsets of a Hierarachical Circuit" by P. J. Russell and G. S. Weinert, application Ser. No. 08/019,924, now U.S. Pat. No. 5,497,335 issued on Mar. 5, 1996, for "Application Generator for Use in Verifying a Hierarchical Circuit Design" by P. J. Russell and G. S. Weinert, and application Ser. No. 08/019,970, now U.S. Pat. No. 5,481,473 issued on Jan. 2, 1996, for "System and Method for Building Interconnections in a Hierarchical Circuit Design" by Y. O. Kim, P. J. Russell and G. S. Weinert, all filed on Feb. 19, 1993, and assigned to a common assignee with this application. The subject matter of this application is also related to application Ser. No. 08/445,436, now U.S. Pat. No. 5,629,861 for "Nested Maximum Space Computation and Efficient Generation of Nested Shape Complementation" by Y. O. Kim and application Ser. No. 08/445,447 for "Efficient Generation of Fill Shapes for Chips and Packages" by D. G. Chesebro, Y. O. Kim, M. A. Lavin and D. N. Maynard, both filed concurrently herewith and assigned to a common assignee with this application. The foregoing applications are incorporated herein by reference.

BACKGROUND OF THE INVENTION

1. Field of the Invention

The present invention generally relates to the design of semiconductor integrated circuits (ICs) or of electronic packages and, more particularly, to an efficient procedure for modifying the design to allow the creation of negative fill shapes, i.e., small holes, which are added to the design to correct for process deviations, e.g., under-etching, due to excessive local pattern density without affecting electrical connectivity.

2. Description of the Prior Art

Semiconductor integrated circuits (ICs) and printed circuit packages typically are composed of structures consisting of several layers of conducting, insulating and other materials that are structured in the horizontal dimension by fabrication processes that transfer patterns defined in physical designs or layouts. The physical designs are represented by computer data representing two-dimensional shapes. The computer data are organized in a hierarchical data structure that exploits the repetitive structure usually found in circuits and packages.

In some cases, the action of the fabrication processes is affected by the design patterns being transferred to the physical materials. For example, the local pattern density of the design, i.e., the fraction of area over which material is deposited (or removed) can affect the shapes and dimensions of features, with the "locality extent" dependent on the specific fabrication process. As a specific example, this can occur in reactive ion etching (RIE), in which an excess in local pattern density (meaning that less material is to be etched away) causes nearby pattern features to be too small (i.e., "overetched") due to relatively high concentration of etchants. This effect appears to act at a length scale of hundreds of micrometers to millimeters. Other processes that may be affected by local pattern density include lithographic patterning of resist materials and chemical-mechanical (so called "chemech") polishing (CMP).

There are a variety of approaches to solving this problem, some of which pertain to the fabrication process itself, while others work by modifying the physical design to mitigate the pattern-dependent effects. The approach of the latter type solution is to reduce deviations from design to fabricated part by adding fill holes that have no electrical function but which reduce variations in local pattern density. There are several drawbacks to this approach including fill holes may are difficult to add to the design manually and may be computationally costly to generate automatically, and fill holes may significantly increase data size of the physical design, making subsequent data-handling steps (e.g., mask fracturing) more difficult.

U.S. Pat. No. 5,278,105 to Eden et al. describes the use of fill shapes for correcting process problems due to local pattern density deficiencies; however, there is no description of the method of generating those fill shapes. Moreover, Eden et al. are concerned only with the generation of fill shapes to be added to the design and do not consider the alternative need to add negative fill shapes or holes to the design to compensate for an excess in local pattern density.

SUMMARY OF THE INVENTION

It is therefore an object of the present invention to provide an efficient method for modifying a chip or package design to allow for the creation of negative fill shapes or holes without excessive computation or expansion of design data.

According to the invention, there is provided a computer-implemented system that takes a physical design, represented in a computer data file, and generates a modified version of the design in which fill holes have been added. Subsequently, when the modified design is processed, the resulting semiconductor chip or package will contain physical images of the added fill holes, with the effect of making local pattern density more uniform and hence reducing process-induced variations in feature size and shape.

In a preferred embodiment of the invention, fill holes in the physical design are generated within areas-to-be-holed. The process begins by fracturing the areas-to-be-holed into simple, non-overlapping shapes (e.g., rectangles, triangles and/or trapezoids). A maximum set of unit cells, each containing one or more fill holes, that fit within the borders of the fractured areas-to-be-holed is then determined. Shapes that cover the set of unit cells are subtracted from the areas-to-be-holed. The final output is the union of the result of that subtraction and the set of fitting unit cells.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention may be implemented on a variety of hardware platforms, including personal computers (PCs), workstations, mini-computers, and mainframe computers. Many of the steps of the method according to the invention may be advantageously implemented on parallel processors of various types. Parallel processing is common in mainframe computers and increasingly more common in mini-computers and workstations. Therefore, by way of example and not limitation, there is first described a representative hardware environment on which the invention may be implemented.

Figure 1:
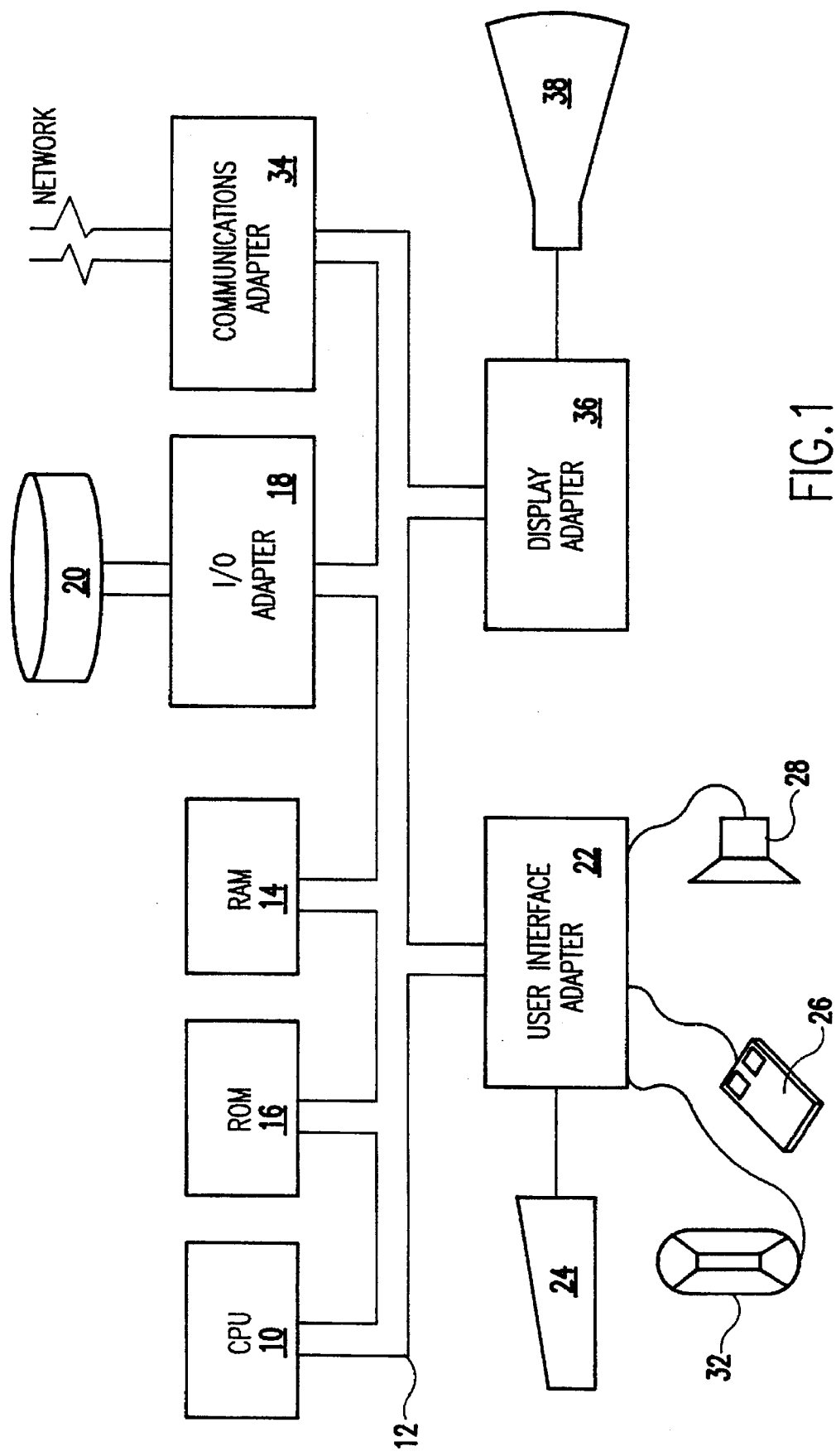
FIG. 1 is a block diagram showing a hardware configuration on which the subject invention may be implemented.

Referring now to the drawings, and more particularly to FIG. 1, there is shown a representative hardware environment which may be a personal computer, such as the International Business Machines (IBM) Corporation's PS/2 family of Personal Computers, or a workstation, such as IBM's RS/6000 Workstation. The hardware includes a central processing unit (CPU) 10, which may conform to Intel's X86 architecture or may be a reduced instruction set computer (RISC) microprocessor such as IBM's PowerPC microprocessor. The CPU 10 is attached to a system bus 12 to which are attached a read/write or random access memory (RAM) 14, a read only memory (ROM) 16, an input/output (I/O) adapter 18, and a user interface adapter 22. The RAM 14 provides temporary storage for application program code and date, while ROM 16 typically includes the basic input/output system (BIOS) code. The I/O adapter 18 is connected to one or more Direct Access Storage Devices (DASDs), here represented as a disk drive 20. The disk drive 20 typically stores the computer's operating system (OS) and various application programs, each of which are selectively loaded into RAM 14 via the system bus 12. The user interface adapter 22 has attached to it a keyboard 24, a mouse 26, a speaker 28, a microphone 32, and/or other user interface devices (not shown). The personal computer or workstation also includes a display 38, here represented as a cathode ray tube (CRT) display but which may be a liquid crystal display (LCD) or other suitable display. The display 38 is connected to the system bus 12 via a display adapter 34. Optionally, a communications adapter 34 is connected to the bus 12 and to a network, for example a local area network (LAN), such as IBM's Token Ring LAN. Alternatively, the communications adapter may be a modem connecting the personal computer or workstation to a telephone line as part of a wide area network (WAN).

Figure 2:
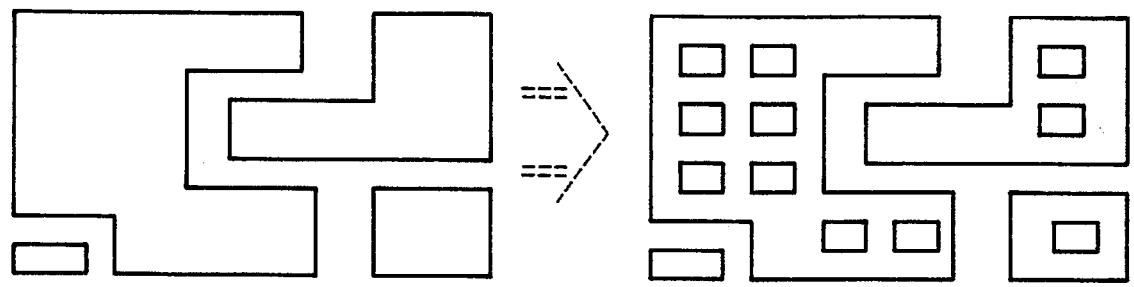
FIG. 2 is a geometric illustration of the results of the computation of the areas in a circuit design with "fill holes" added.

FIG. 2 illustrates the process of reducing deviations from design to fabricated part by adding fill holes that have no electrical function but which reduce variations in local pattern density. In the example illustrated, note that several areas are not covered with "fill holes" because of a constraint that all the holes lie on the same grid. Broadly described, the process first fractures the areas-to-be-holed into simple, non-overlapping shapes. These shapes may be, for example, rectangles, triangles and/or trapezoids. Next, a maximum set of unit cells is determined. Each of these unit cells contain one or more fill holes that fit within the borders of the fractured areas-to-be-holed. The shapes that cover the set of unit cells are then subtracted from the areas-to-be-holed. The final result is the union of the result of that subtraction and the set of fitting unit cells.

The preferred embodiment of the invention is implemented on a hardware platform such as that generally shown in FIG. 1 or, as mentioned above, on a mini-computer or mainframe computer. The process according to the invention will now be described by way of flow diagrams and a specific example.

Figure 3:
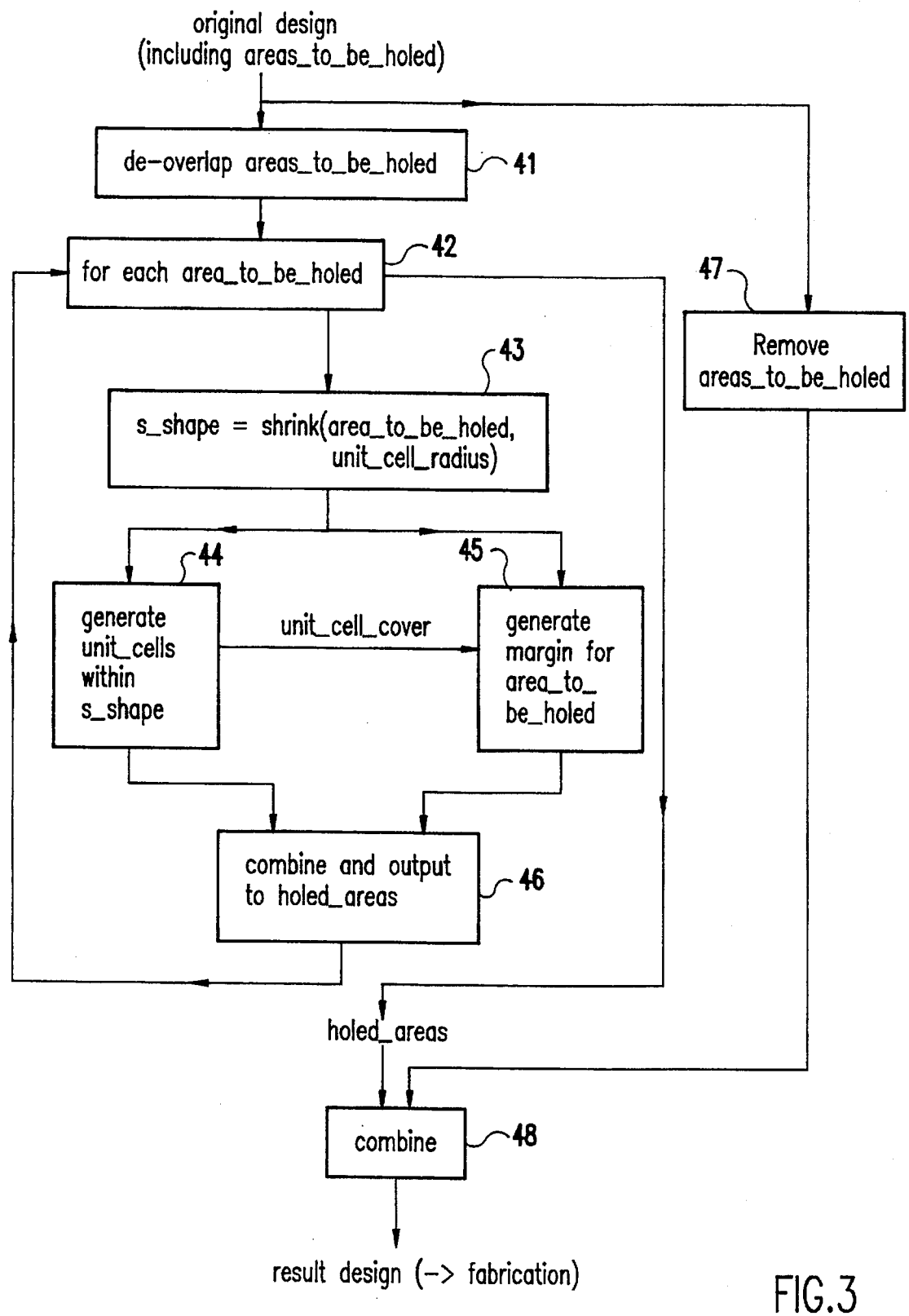
FIG. 3 is a top level flow diagram of the computer program that takes a physical design represented in a computer data file and generates a modified version of the design according to the invention.

FIG. 3 shows the top level flow diagram of the computer program according to a preferred embodiment of the invention. The original design, including the areas-to-be-holed, is input. The first step 41 in the generation of negative fill shapes or holes is to deoverlap the areas-to-be-holed. The process then enters a loop at decision block 42. The loop processes each area-to-be-holed until all such areas are processed. The first step 43 in the loop is generate a shrink shape (s_shape) by shrinking the area-to-be-holed by a unit-cell-radius. The generated s_shape is supplied to each of function blocks 44 and 45. In function block 44, unit cells are generated within the s_shape, and a unit cell cover is supplied to function block 45 where a margin for the area-to-be-holed is generated. The outputs of function blocks 44 and 45 are combined in function block 46 to iteratively generate a holed areas output. The process loops back to decision block 42.

Meanwhile, the areas-to-be-holed are removed from the original design in function block 47. When the processing of each area-to-be-holed is completed, the holed areas are combined with the original design in function block 48 to produce the resultant design.

In more detail, overlapping parts of shapes on the areas-to-be-holed level are removed in step 41 with a deOverlap operation to preserve "nestedness", as taught in applications Ser. No. 08/019,971, Ser. No. 08/019,927, Ser. No. 08/019,924, and Ser. No. 08/019,970, referenced above. The shapes are segmented into shapes consisting of four or fewer vertices, resulting in areas-to-be-holed that are covered by rectangles, triangles and/or trapezoids. The effect of these operations is that fill holes can be added to the resulting shapes independently and efficiently.

Figure 4:
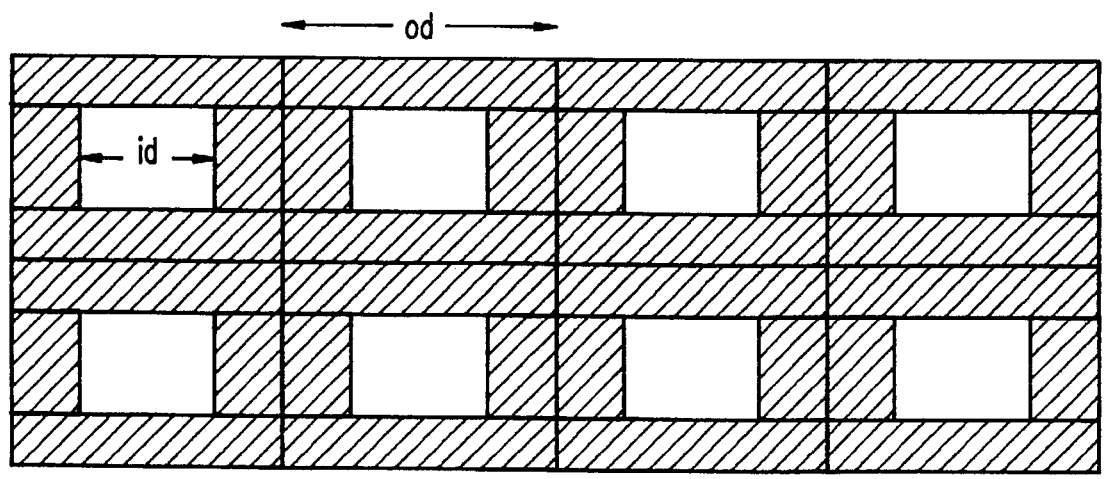
FIG. 4 is a block diagram illustrating an array of unit cells each consisting of a 2 µm×2 µm square in a 4 µm×4 µm frame.

In function block 44, the maximum set of fitting units cells is determined. This is done as arrays of unit cells as shown in FIG. 4 so that the fill holes may be represented efficiently. Each unit cell consists of four (positive rectangular shapes to accommodate the fact that certain shape-processing programs are not able to handle true holes (i.e., negative shapes). The dimensions id and od are selected so that the fill holes satisfy ground rules for minimum feature width and spacing and to provide a density equal to that of "typical" areas of the chip. For example, if the density is 25%, then values of 2 µm and 4 µm could be used for id and od.

Figure 5:
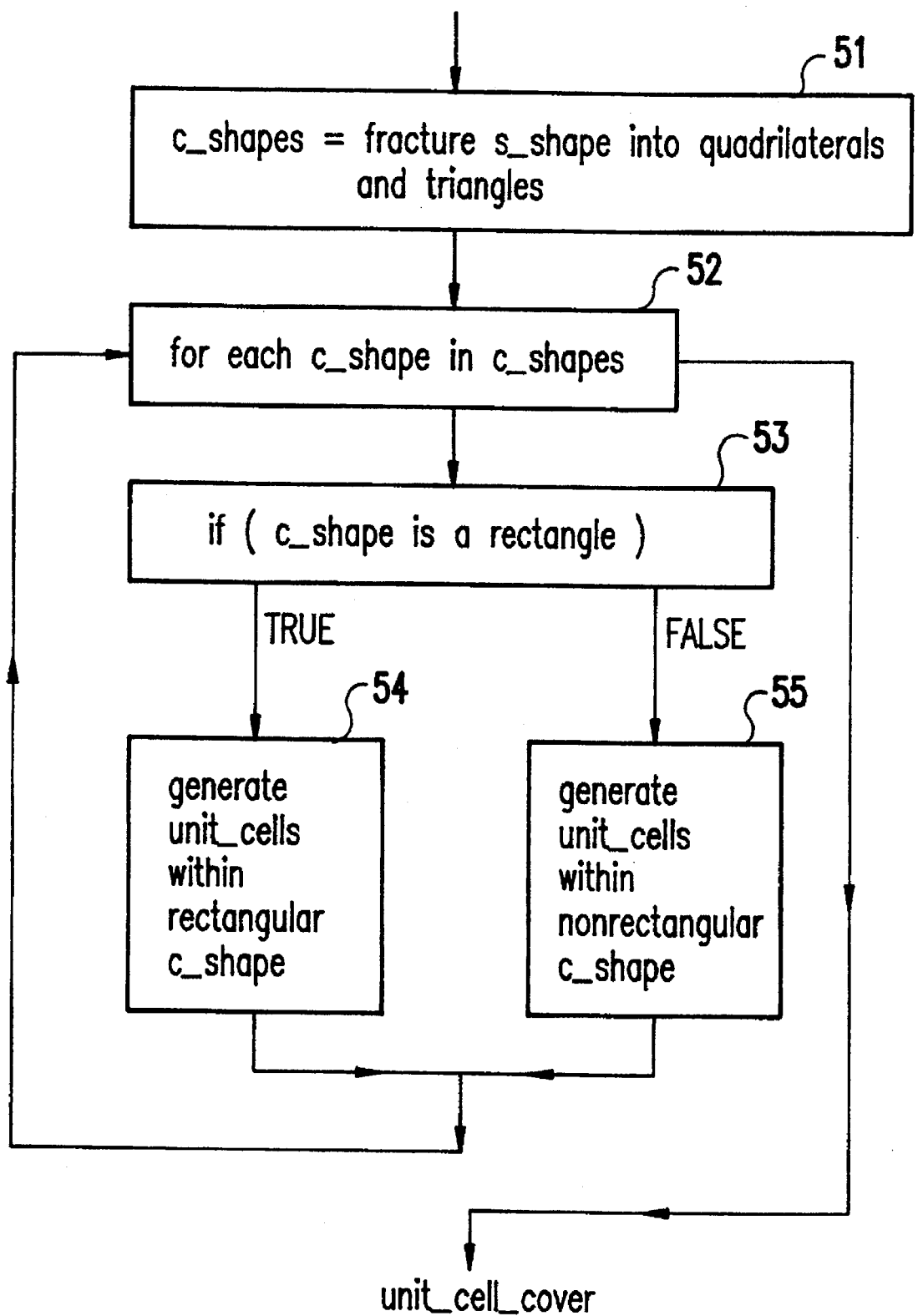
FIG. 5 is a flow diagram illustrating the logic of the process of generating unit cells.
Figure 8A:
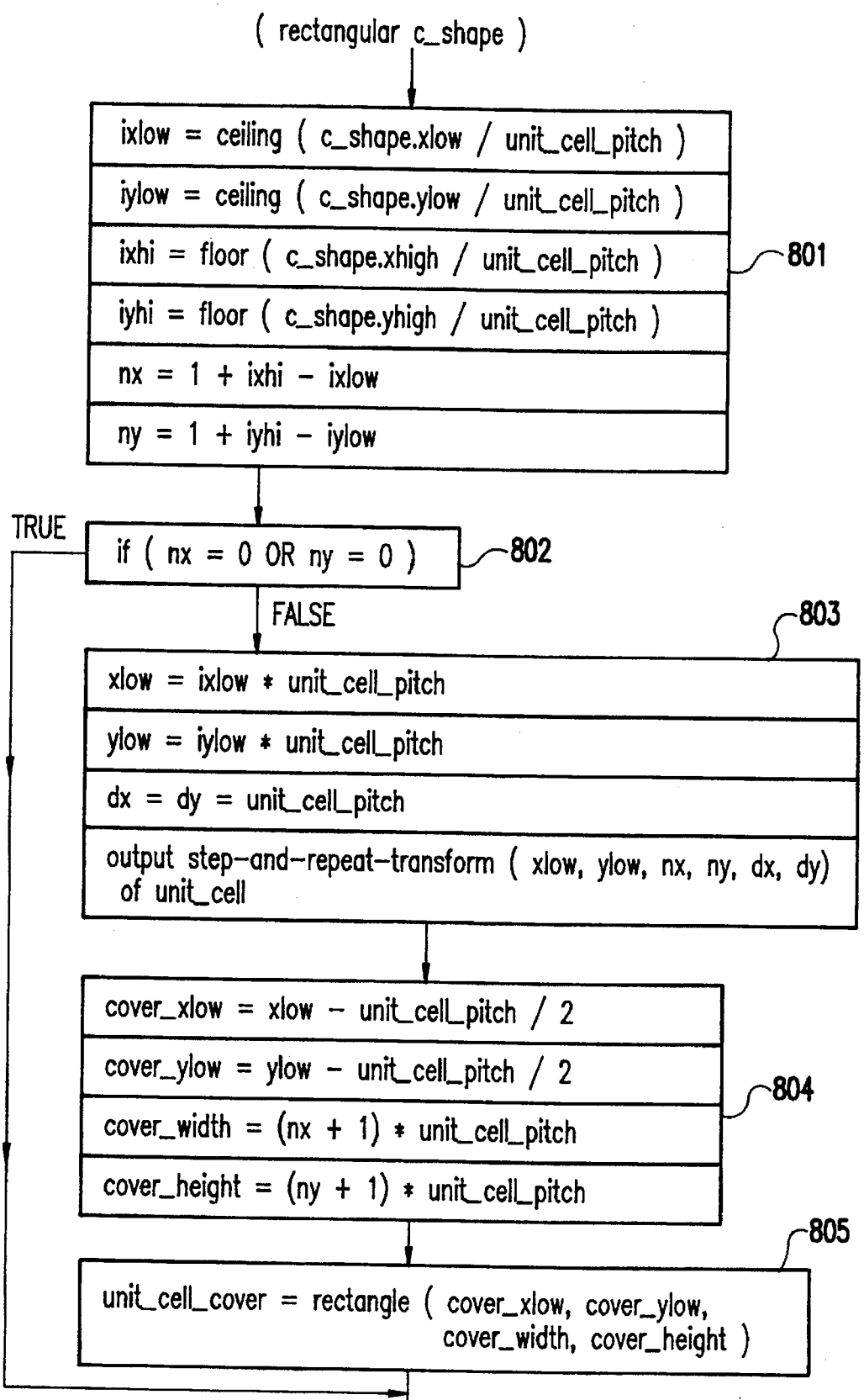
FIGS. 8A and 8B are respectively flow diagrams of the routines used in the process of FIG. 4 for generating unit cells within rectangular shapes and non-rectangular shapes.
Figure 8B:
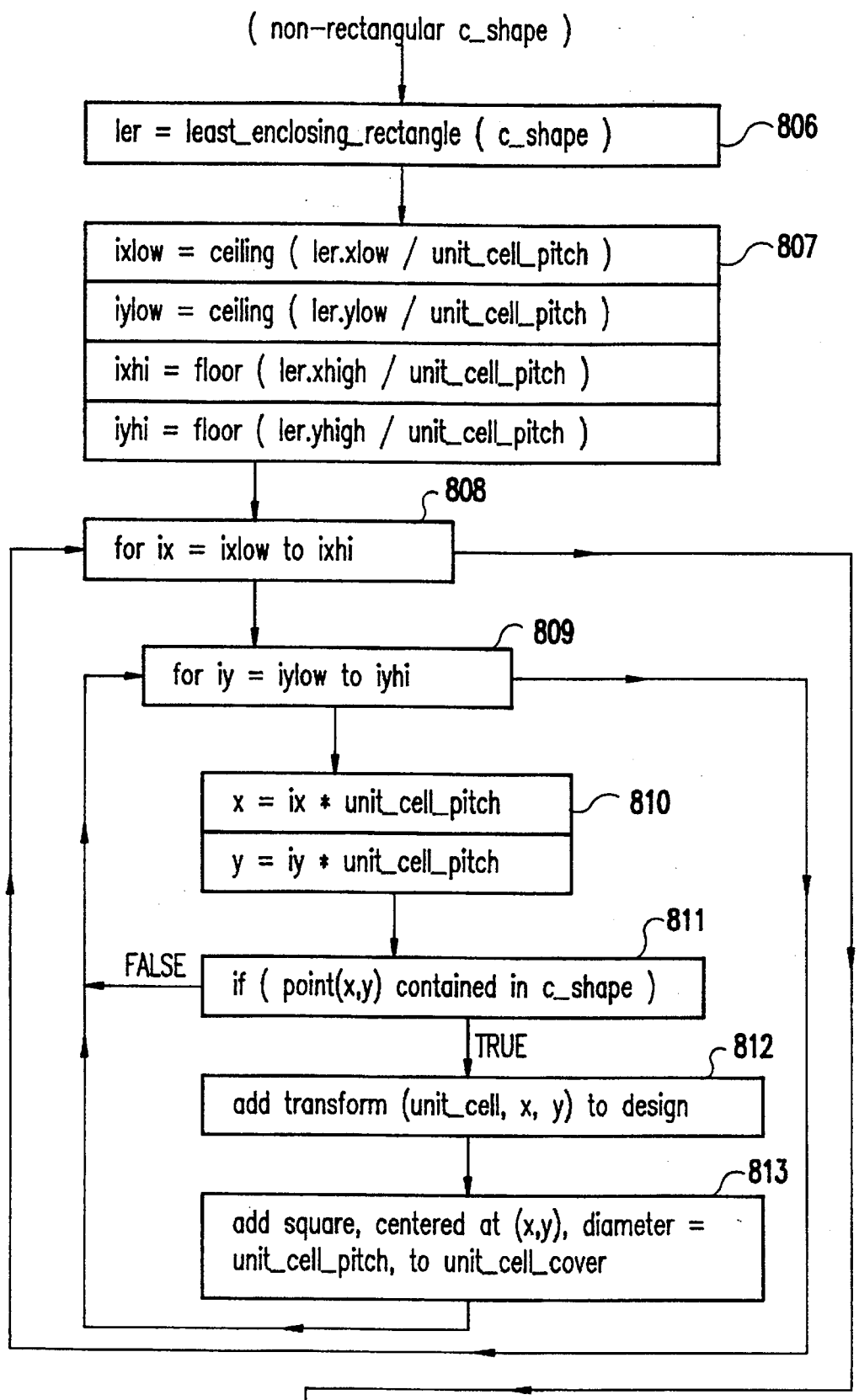

The flow diagram for this process is shown in FIG. 5, to which reference is now made. In the first step 51, geometric shapes (c_shapes) are generated by fracturing the shrink shape (s_shape) into quadrilaterals and triangles. In the next step 52, a loop is entered to process each of the computed c_shapes. In decision block 53, a determination is made as to whether the c_shape is a rectangle. If it is, the routine shown in the flow diagram of FIG. 8A is called in step 54; otherwise the routine shown in the flow diagram of FIG. 8B is called in step 55. When holes have been generated by either routine, the process loops back to step 52 to process the next c_shape. When all c_shapes have been processed, the process is complete, outputting the unit_cell_cover to function block 45 in FIG. 4. In function block 45, the margin for the area-to-be-holed is computed as the difference of the area-to-be-holed and the unit cell cover.

To populate each area-to-be-holed with fill holes, we employ the following procedure. Each of the resulting shapes is shrunk by half the diameter of the "unit cell" (in the example illustrated, 2 μm). This will ensure that we do not place any part of the fill unit cell outside the bounds of the areas-to-be-holed. The resulting shape is intersected with a (conceptually) infinite array of points spread on the pitch of the intended fill pattern (4 μm in X and Y directions for the example illustrated). In practice, this is done by enumerating the grid points in the X,Y range of the area-to-be-holed shape's bounding box.

Figure 6:
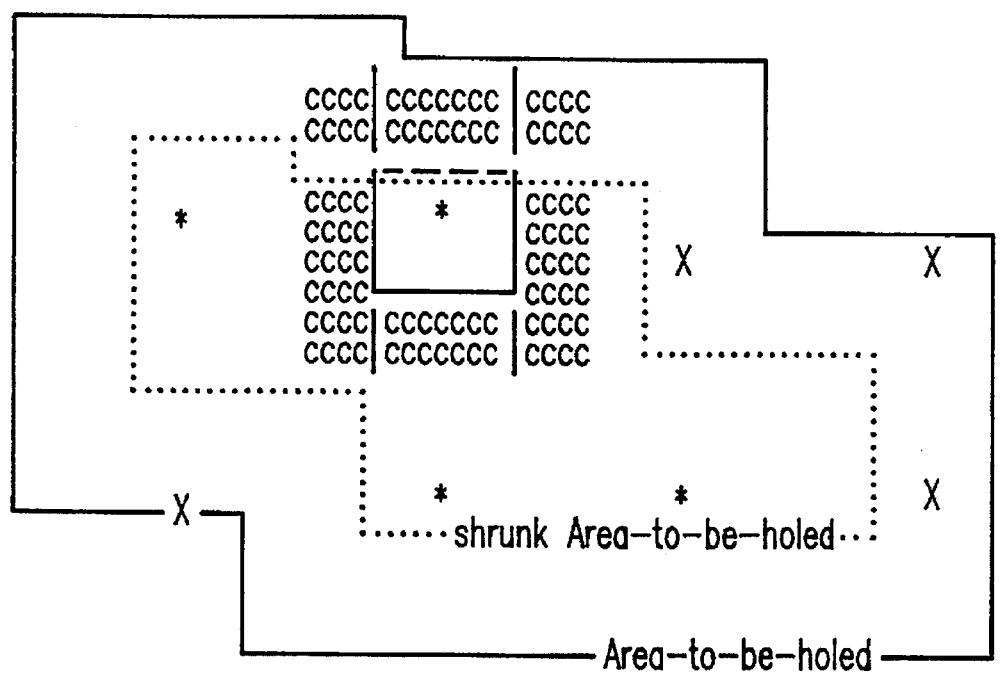
FIG. 6 is a geometric illustration of the special case here the area-to-be-holed shape is a non-rectangle.

An instance of the unit cell is placed with its center at each of the points resulting from the previous step. This constitutes the fill shapes. For the case where the area-to-be-holed shape is a rectangle, the set of grid points is a rectangular subset of the infinite grid, say NROWS by NCOLS, illustrated by way of example in FIG. 6. In this case, a set of NROWS×NCOLS individual cell transforms representing the placements can be replaced by a single step-and-repeat transform or matrix copy of the unit cell with the specified pitch (e.g., 4 μms), X and Y counts (NROWS, NCOLS) and appropriate translation origin. This special case handling of rectangles-to-be-holed results in considerable savings in output storage size and execution time in subsequent manipulation of these data (e.g., mask-fracturing).

Figure 7:
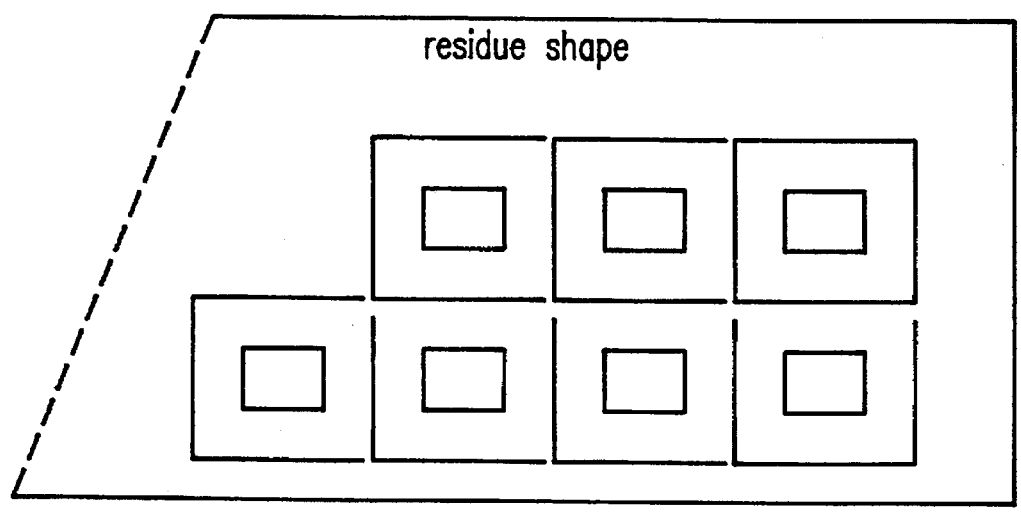
FIG. 7 is a geometric illustration showing the result of "holing" the areas-to-be-holed leaving a residue shape.

Because the set of unit cells generated in the previous step do not completely cover the areas-to-be-holed, e.g., because of the constraint that all unit cells fall on a common grid, it is next necessary to generate the "residue shapes" that, when added to the generated unit cells, correctly constitute the result of "holing" the areas-to-be-holed, as generally illustrated in FIG. 7. This generation is performed in two steps for each area-to-be-holed and its respective unit cells. First, the "covers" of the unit cells, i.e., the unit cells with the holes filled in (typically a set of squares), are unioned together. For the case where the area-to-be-holed is rectangular, the resulting set of unit cells is a rectangular array, and this step of unioning can be replaced by direct construction of the overall covering rectangle. The unioned covers are then subtracted from their respective area-to-be-holed, producing the residue shapes.

FIG. 8A shows the process of generating unit cells within a rectangular c_shape. In step 801 the rectangular c_shape is input. In the first sub-step, ixlow is computed as the ceiling of c_shape.xlow divided by the unit_cell_pitch. In the next sub-step, iylow is computed as the ceiling of c_shape.ylow divided by the unit_cell_pitch. In the next sub-step, ixhi is computed as the floor of c_shape.xhigh divided by the unit_cell_pitch. In the sub-step, iyhi is computed as the floor of c_shape.yhigh divided by the unit_cell_pitch. In the next two substeps, nx is computed as the sum of 1 plus ishi minus ixlow, and ny is computed as 1 plus iyhi minus iylow.

A test is then made in decision block 802 to determine if either nx or ny are zero. If not, the process goes to step 803; otherwise, the routine exits. There are several sub-steps in step 803. The first sub-step computes xlow as the product of ixlow times fill_cell_pitch. The next sub-step computes ylow as the product of iylow times fill_cell_pitch. In the next sub-step, the differentials dx and dy are set to unit_cell_pitch. The last sub-step is to output a step-and-repeat-transform using xlow, ylow, nx, ny, dx, and dy of the unit_cell.

The next step 804 also includes several substeps. The first substep is to compute cover_xlow as xlow minus half the unit cell pitch. In the next substep, cover_ylow is computed as ylow minus half the unit cell pitch. In the next substep, cover_width is computed as computed as the product of the sum nx plus 1 and the unit cell pitch. In the final substep, the cover_height is computed as the product of the sum ny plus 1 and the unit cell pitch. These computation are then used in step 805 to compute the unit cell cover as the rectangle defined by the vertices cover_xlow, cover_ylow, cover_width, and cover_height.

The process of generating a non-rectangular fill is shown in FIG. 8B and is a bit more complex than the special case of generating the unit cells within a rectangular c_shape. The unit cells within a non-rectangular c_shape is input to function block 806 where a least_enclosing_rectangle (ler) for the c_shape is first generated. This least enclosing rectangle (ler) shape is input to step 807 which comprises a series of substeps. In the first sub-step, ixlow is computed as the ceiling of ler.xlow divided by the unit_cell_pitch. In the next sub-step, iylow is computed as the ceiling of ler.ylow divided by the unit_cell_pitch. In the next sub-step, ixhi is computed as the floor of ler.xhigh divided by the unit_cell_pitch, followed by the next sub-step where iyhi is computed as the floor of ler.yhigh divided by the unit_cell_pitch. At this point, the process enters a pair of nested loops at steps 808 and 809 to process each ix from ixlow to ixhi and iy from iylow to iyhi. In step 810, x is computed as the product of ix times the unit_cell_pitch, and y is computed as the product of iy times the unit_cell_pitch. A test is made in decision block 811 to determine if point (x,y) is contained in the c_shape being processed. If not, the process loops back to step 809 to process the next iy, and when all iys have been processed, the process loops back to step 808 to process the next ix until all ixs have been processed, at which point the routine exits. If the point (x,y) is in the c_shape being processed, the transform (unit_cell,x,y) is added to the design in function block 812. Then a square, centered at (x,y) and with a diameter approximately equal to the unit cell pitch, is added to the unit cell cover in function block 813, before the process loops back to decision block 84 to continue the loop processing.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer-implemented method for modifying an integrated circuit chip or package design by adding negative fill shapes to the design comprising the steps of:

inputting an original design, including areas to which negative fill shapes are to be added, as a data file;

deoverlapping areas to which negative fill shapes are to be added and fracturing the deoverlaped areas to which negative fill shapes are to be added into geometric shapes;

determining a maximum set of unit cells, each containing one or more negative fill shapes, that fit within borders of the fractured areas to which negative fill shapes are to be added and generating areas with the negative fill shapes;

subtracting the areas to which negative fill shapes are to be added from the original design; and combining the generated areas with the negative fill shapes with the original design minus the areas to which negative fill shapes are to be added to produce a resultant design for fabrication.

2. The computer-implemented method for modifying an integrated circuit chip or package design recited in claim 1 wherein the negative fill shapes are geometric shapes which are rectangles, quadrilaterals and triangles.

3. The computer-implemented method for modifying an integrated circuit chip or package design recited in claim 1 further comprising the step of determining placements of the negative fill shapes unit cell by generating a repetitive array of unit cells and selecting those completely covered by the areas to which negative fill shapes are to be added.

4. The computer-implemented method for modifying an integrated circuit chip or package design recited in claim 1 further comprising the steps of:

determining placements of the fill pattern unit cell by shrinking the areas to which negative fill shapes are to be added;

determining which of an infinite regular array of grid points fall in the areas to which negative fill shapes are to be added; and generating a placement for each point.

5. The computer-implemented method for modifying an integrated circuit chip or package design recited in claim 1 further comprising the steps of:

determining placements of the fill pattern unit cell by shrinking a rectangular area to which negative fill shapes are to be added;

determining a rectangular subset of an infinite regular array of grid points that fall in the areas to which negative fill shapes are to be added; and generating a step-and-repeat placement of the negative fill shapes unit cell corresponding to that rectangular subset.

6. A programmed computer system for modifying an integrated circuit chip or package design represented by a data file, comprising:

means for accessing said data file of an original design, including areas to which negative fill shapes are to be added, as a data file, and deoverlapping areas to which negative fill shapes are to be added and fracturing the deoverlaped areas to which negative fill shapes are to be added into geometric shapes;

computing means for determining a maximum set of unit cells, each containing one or more negative fill shapes, that fit within borders of the fractured areas to which negative fill shapes are to be added and generating areas containing negative fill shapes, said computing means subtracting the areas to which negative fill shapes are to be added from the original design; and combining means for combining the areas containing negative fill shapes with the original design minus the areas to which negative fill shapes are to be added to generate a resultant design.

* * * * *